(12) United States Patent
Ueda

(10) Patent No.: US 8,397,851 B2
(45) Date of Patent: Mar. 19, 2013

(54) SWIVELING WORK MACHINE

(75) Inventor: Masaaki Ueda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/223,814

(22) Filed: Sep. 1, 2011

(65) Prior Publication Data

US 2012/0067658 A1 Mar. 22, 2012

(30) Foreign Application Priority Data

Sep. 22, 2010 (JP) ................. 2010-212158

(51) Int. Cl.
*B60K 11/00* (2006.01)
*B60K 11/04* (2006.01)
(52) U.S. Cl. ............... 180/68.1; 180/68.2; 180/68.4
(58) Field of Classification Search ............... 180/89.16, 180/89.12, 68.1, 326–328, 69.21, 759, 757, 180/37

See application file for complete search history.

(56) References Cited

U.S. PATENT DOCUMENTS 7,481,289 B2 * 1/2009 Ueda et al. ................ 180/89.16
8,215,434 B2 * 7/2012 Matsushita et al. .......... 180/68.4

FOREIGN PATENT DOCUMENTS

JP 2002087043 A 3/2002

* cited by examiner

*Primary Examiner* — John Walters
*Assistant Examiner* — James Triggs
(74) *Attorney, Agent, or Firm* — The Webb Law Firm

(57) ABSTRACT

A swiveling work machine includes: a swivel deck; an engine disposed rearward of the swivel deck; a suction type radiator disposed rearward of the swivel deck; a bonnet covering the engine and the radiator and forming an engine room; a cabin disposed frontward of the engine room; a partition wall standing on the swivel deck between the cabin and the engine room and forming a front portion of the bonnet; an air conditioner main body disposed frontward of the partition wall and in a lower portion of the cabin; an ambient air inlet for supplying ambient air to the air conditioner main body, the ambient air inlet being formed in a portion of the partition wall facing a radiator suction space; and a filter provided in the ambient air inlet.

3 Claims, 6 Drawing Sheets

SWIVELING WORK MACHINE

BACKGROUND

1. Field of the Invention

The present invention relates to a swiveling work machine having a mechanism for introducing ambient air to an air conditioner main body.

2. Description of the Related Art

Conventionally, there has been known an ambient air introduction mechanism of an air conditioner to be used for a construction machine.

Such an ambient air introduction mechanism includes: an ambient air introduction duct for taking ambient air, which is connected to an air conditioner main body; an ambient air introduction filter for preventing dust or the like from entering the ambient air introduction duct; and a filter case to which the ambient air introduction filter is removably attached, all disposed in an enlarged space of a housing structure formed by inwardly bulging a lower portion of a partition wall positioned rearward of a driver's cabin (see Japanese Unexamined Patent Application Publication No. 2002-87043).

SUMMARY OF THE INVENTION

However, in the conventional ambient air introduction mechanism of the air conditioner described above, an ambient air inlet is provided in an outer face of the filter case protruding rearward from the partition wall, and thus a distance to the air conditioner main body tends to be long.

Therefore, it has been desired to provide a swiveling work machine in which the distance for ambient air introduction from the ambient air inlet to the air conditioner main body is made as short as possible.

The swiveling work machine according to the present invention includes: a swivel deck; an engine disposed rearward of the swivel deck; a suction type radiator disposed rearward of the swivel deck; a bonnet covering the engine and the radiator and forming an engine room; a cabin disposed frontward of the engine room; a partition wall standing on the swivel deck between the cabin and the engine room and forming a front portion of the bonnet; an air conditioner main body disposed frontward of the partition wall and in a lower portion of the cabin; an ambient air inlet for supplying ambient air to the air conditioner main body, the ambient air inlet being formed in a portion of the partition wall facing a radiator suction space; and a filter provided in the ambient air inlet.

As in the present configuration, by providing the filter to the ambient air inlet formed directly in the partition wall itself, the distance from the ambient air inlet to the air conditioner main body can be made as short as possible, and at the same time, ambient air on a radiator suction side can be efficiently introduced through the filter.

In the configuration described above, it is preferable that the ambient air inlet is formed in an intake duct protruding frontward from the partition wall, the filter is placed in the intake duct, and an ambient air intake planar member for preventing the filter from being detached is removably attached to a rear end side of the intake duct.

According to this configuration, the ambient air intake planar member for preventing detachment of the filter provided in the intake duct protruding frontward from the partition wall is removably attached to the rear end of the intake duct. Accordingly, the intake duct and the ambient air intake planar member are provided in the radiator suction space without protruding rearward, to thereby improve space efficiency of the radiator suction space.

In the configuration described above, it is preferable that the cabin is provided on the swivel deck through a mount device, an introduction duct for leading ambient air to the air conditioner main body is supported on a cabin side, and a front end opening of the intake duct supported on a swivel deck-side faces an opening of the introduction duct on an ambient air introduction side.

According to this configuration, by configuring the front end opening of the intake duct provided on the swivel deck side and the opening on the ambient air introduction side of the introduction duct provided on a cabin side in such a manner that they face each other, and thus by simply mounting the cabin on the swivel deck, an ambient air introduction pathway can be formed up to the air conditioner main body.

DETAILED DESCRIPTION OF THE PREFERRED EMBODIMENT

Hereinbelow, embodiments of the present invention will be described with reference to the drawings. In the following descriptions, the terms "right", "left", "front (frontward)", "rear (rearward)", "upper (upward)" and "lower (downward)" refer to the corresponding directions seen from a driver seated in a driver's seat.

FIGS. 1-6 show a swiveling work machine 1 according to the present invention.

Figure 6:
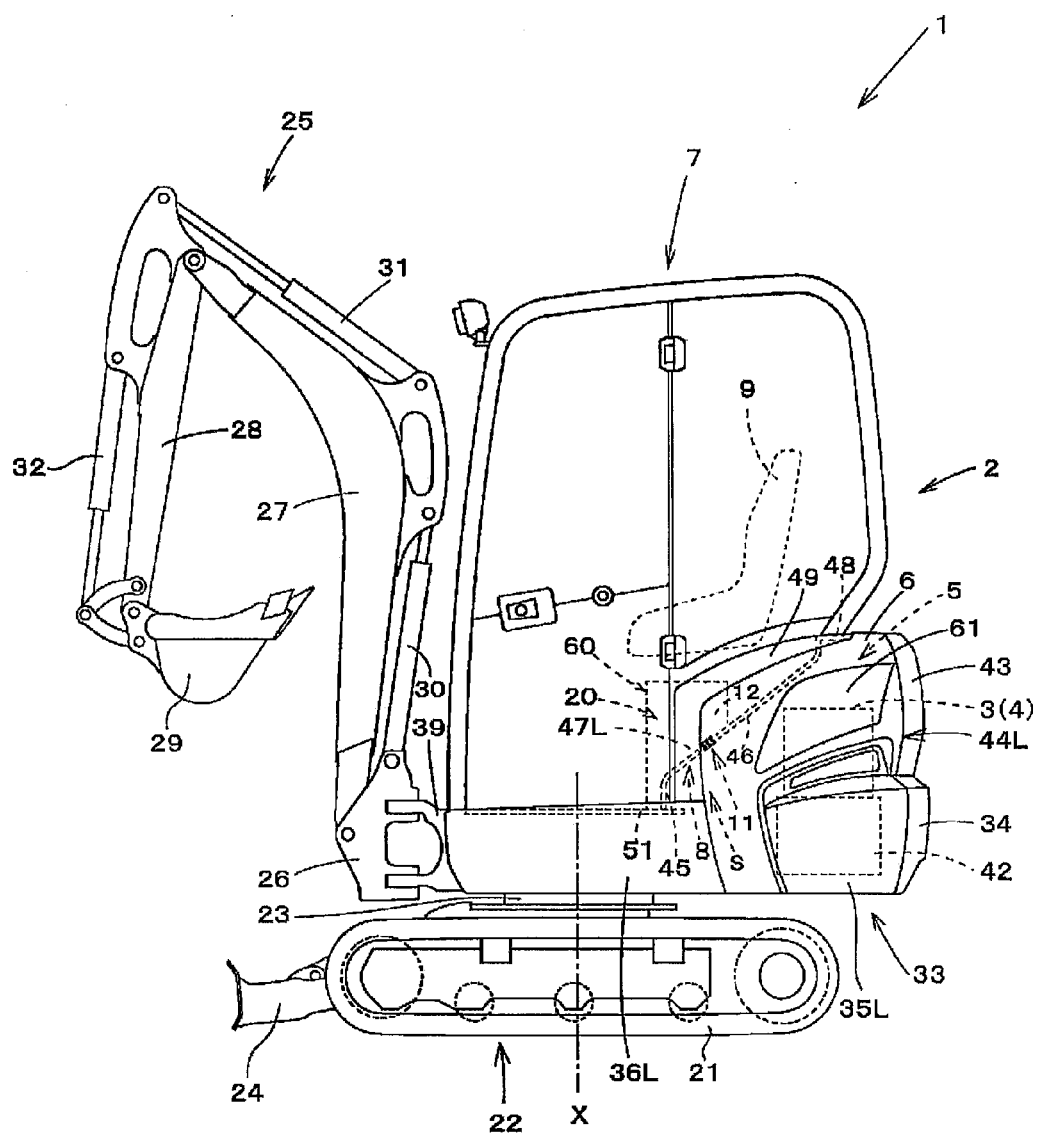
FIG. 6 is a side view of the swiveling work machine.

Referring to FIG. 6, the swiveling work machine 1 includes: a traveling device 22 having a pair of right and left crawler traveling bodies 21; and a swivel deck 2 which is mounted on the traveling device 22 and rotatable about a vertical pivot shaft X through a pivot bearing 23. The traveling device 22 is also provided with a dozer 24 in a front portion thereof.

On the swivel deck 2, a cabin 7 is provided which surrounds a driver's seat 9, an operating lever and the like. In the cabin 7, there is provided an air conditioner 20 for conditioning air. On a front end portion of the swivel deck 2, a ground working device (excavating equipment) 25 is provided. The ground working device 25 includes: a swing bracket 26 which is supported by a front portion of the swivel deck 2 and swingable about a vertical axis; a boom 27 which is supported by the swing bracket 26 and swingable about a horizontal axis; an arm 28 which is connected to a distal end portion of the boom 27 and swingable about a horizontal axis; and a bucket 29 which is connected to a distal end portion of the arm 28 and swingable about a horizontal axis.

The boom 27 is configured to be vertically swingably driven by a boom cylinder 30 provided between the boom 27 and the swivel deck 2. The arm 28 is configured to be swingably driven by an arm cylinder 31 provided between the arm 28 and the boom 27. The bucket 29 is configured to be driven swingably in a raking manner by a bucket cylinder 32 provided between the bucket 29 and the arm 28.

Figure 3:
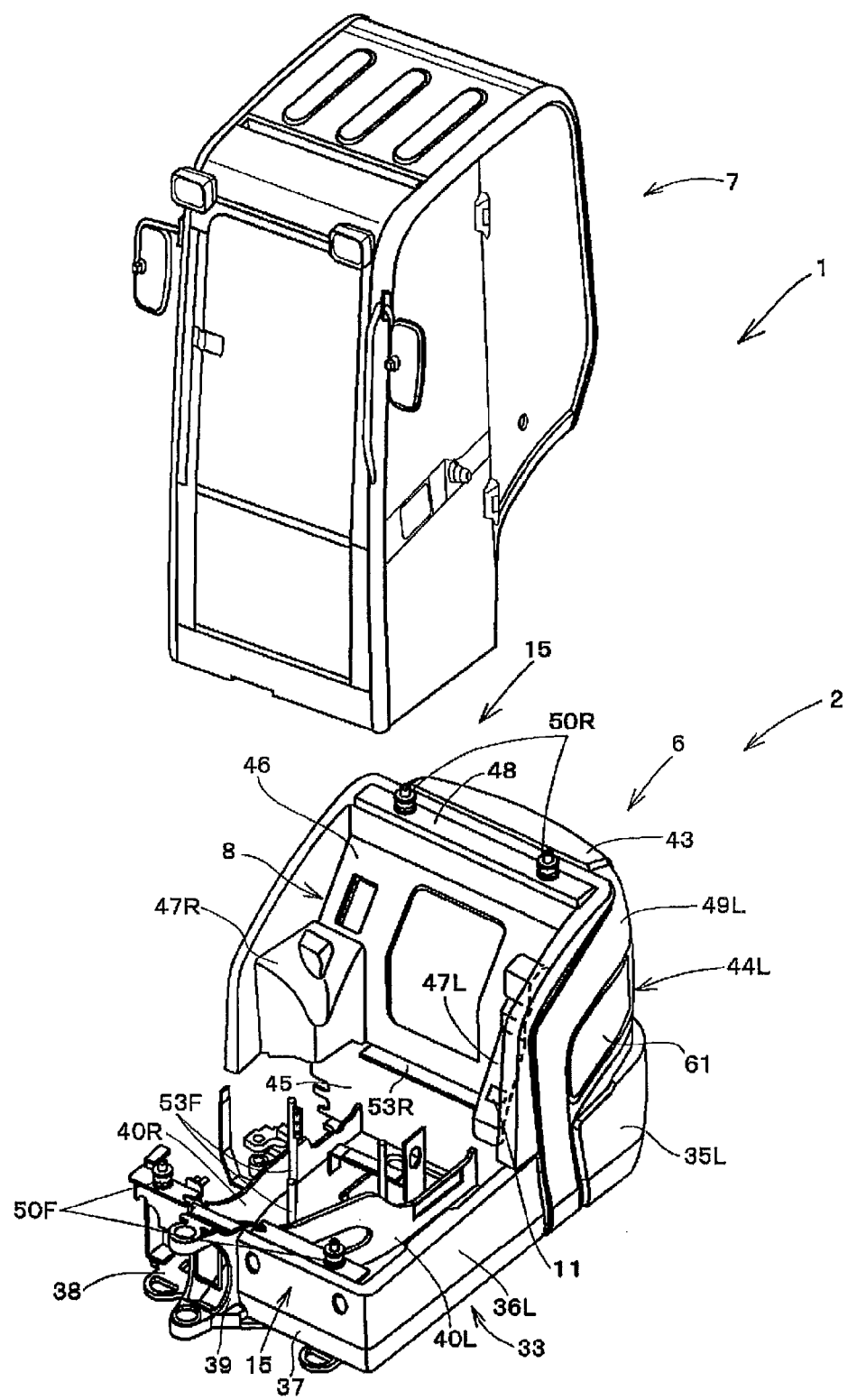
FIG. 3 is an exploded perspective view of a swivel deck and a cabin.
Figure 4:
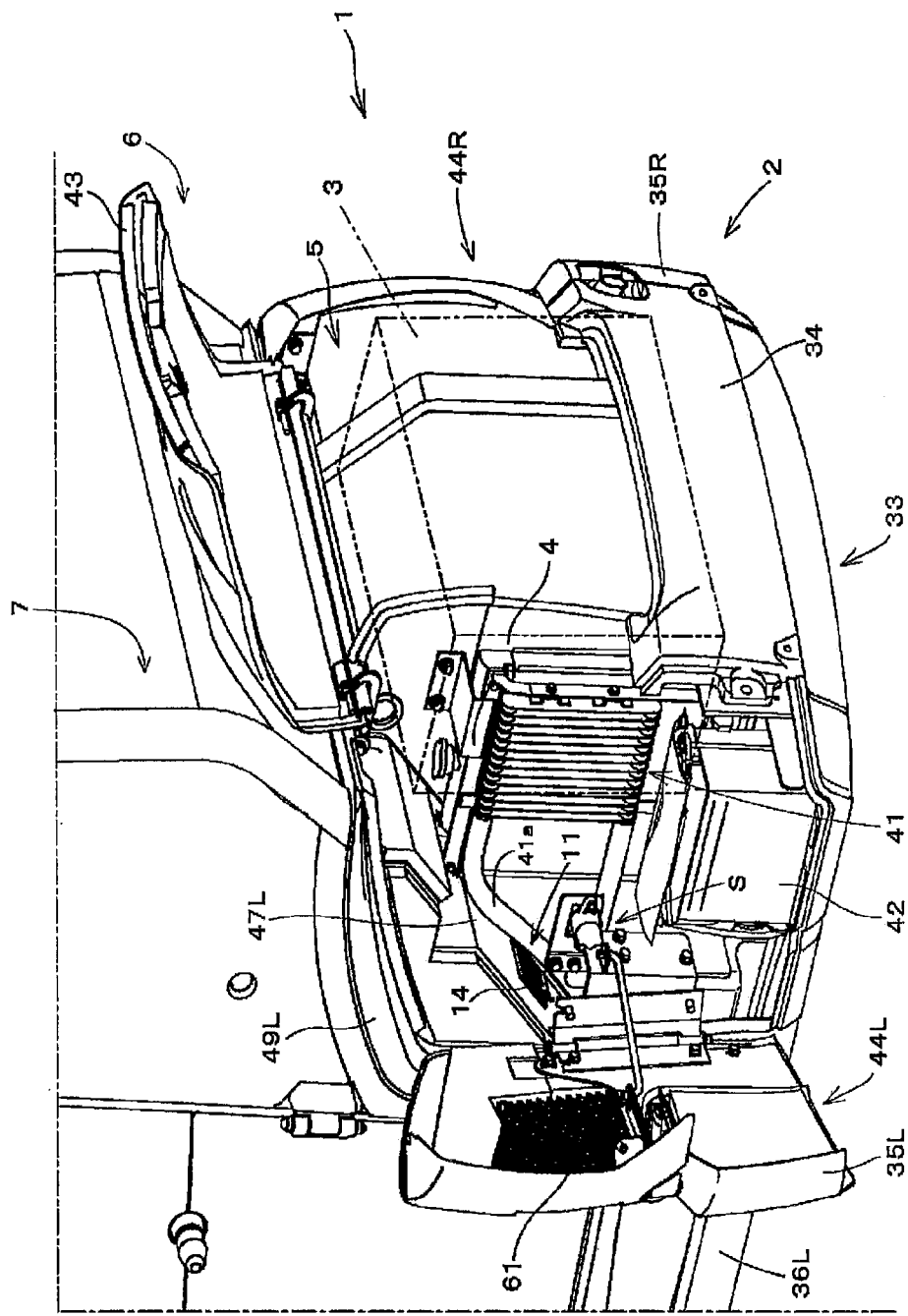
FIG. 4 is a perspective view of an ambient air inlet.

As shown in FIGS. 3 and 4, the swivel deck 2 includes: a pivot frame 33 as a framework; a counter weight 34 attached and fixed to a rear portion of the pivot frame 33; and a pair of right and left lateral protectors 35R, 35L provided on respective lateral sides of the counter weight 34. The counter weight 34 and the lateral protectors 35R, 35L forms a rear portion of the swivel deck 2.

The pivot frame 33 includes: a swivel base 38 which is formed of a plate serving as a bottom wall of the swivel deck 2 and has an engine 3 mounted on a rear portion of the swivel base 38; a support bracket 39 which protrudes frontward from a front end portion of the swivel base 38 and is configured to support the swing bracket 26 of the ground working device 25; a lower wall portion 45 (a part of a partition wall 8) standing on the swivel base 38 in such a manner that a space frontward of the engine 3 is partitioned into front and rear spaces; and a pair of right and left longitudinal ribs 40R, 40L for connecting the support bracket 39 and the lower wall portion 45 above the swivel base 38.

The right and left longitudinal ribs 40R, 40L include: respective front portions which are away from each other from the support bracket 39 toward the rear of the swivel deck 2; respective rear portions which are arranged in parallel; and respective rear ends fixed to the lower wall portion 45 (which will be described later) by welding or the like.

The swivel deck 2 is provided with right and left side cover members 36R, 36L for covering right and left sides of the swivel deck 2, and a front cover member 37 for covering a front face of the swivel deck 2 on right and left sides of the support bracket 39.

Figure 1:
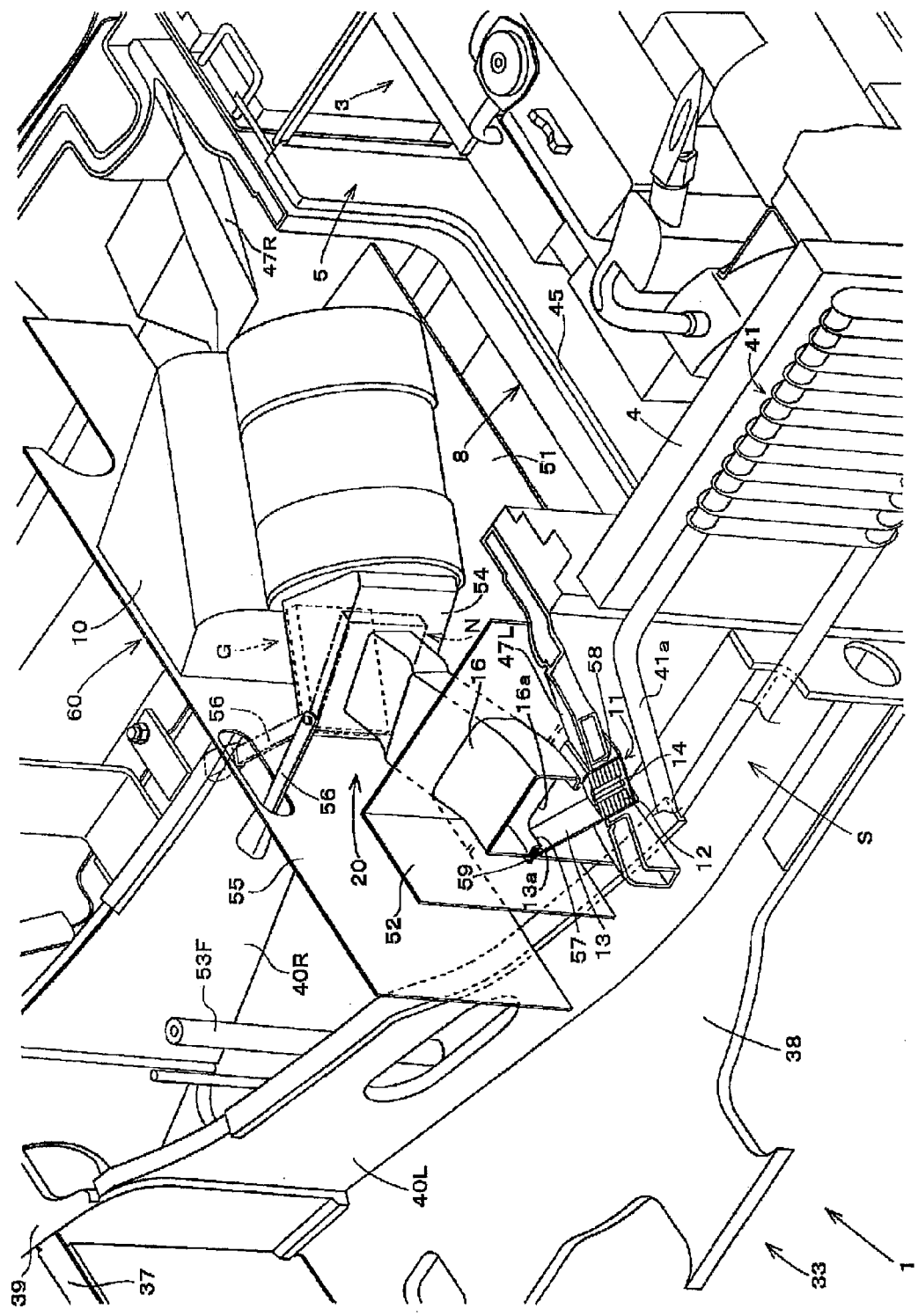
FIG. 1 is a partially sectional perspective view of an ambient air introduction mechanism of a swiveling work machine according to the present invention.
Figure 2:
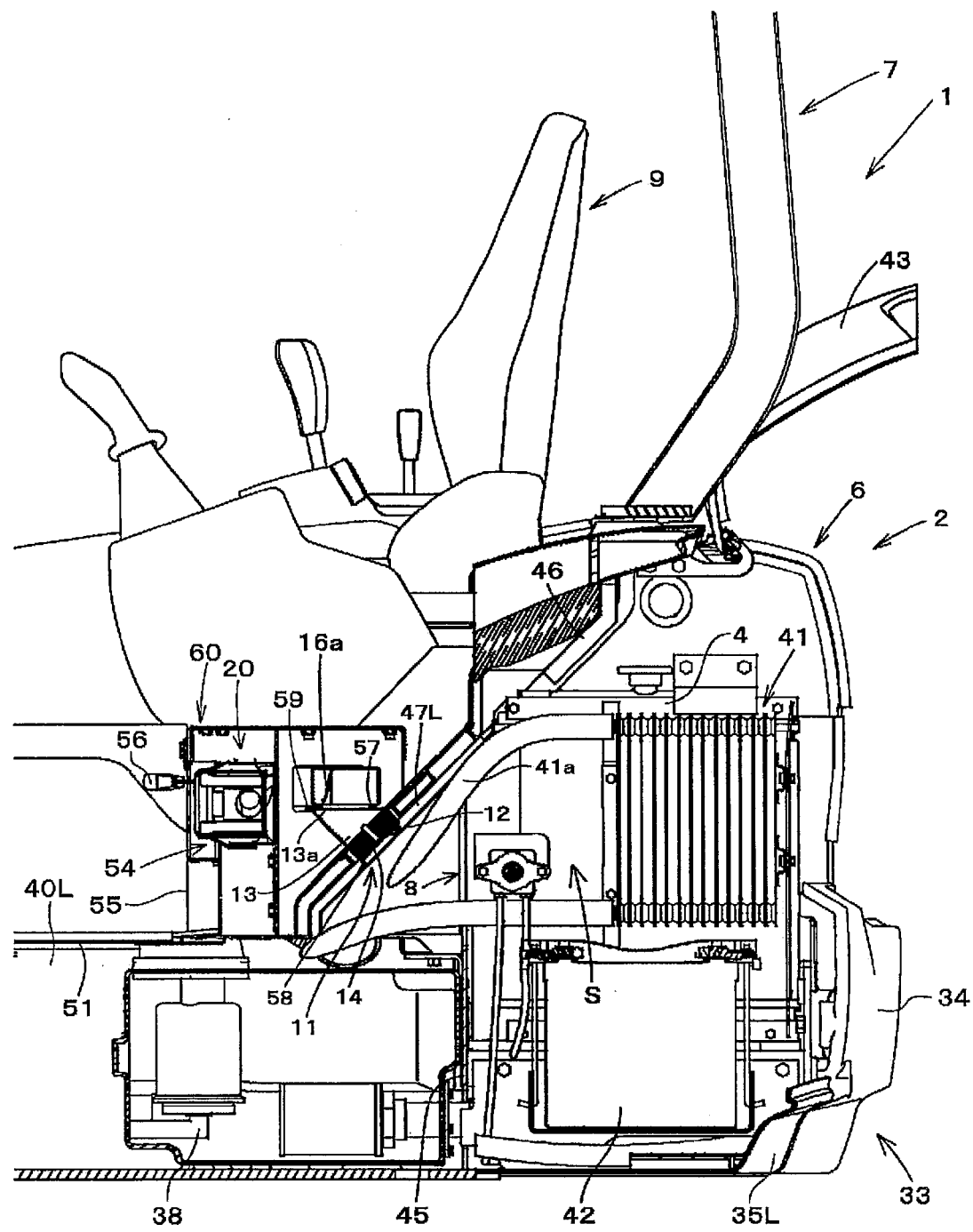
FIG. 2 is a cross-sectional side view of the ambient air introduction mechanism.

As shown in FIGS. 1 and 2, the engine 3, a radiator 4 and the like are attached to the rear portion of the swivel deck 2 through a mounting member, and an engine room 5 surrounding these components is covered with a bonnet 6.

In the engine room 5, on one lateral side (left side in the drawing) of the engine 3 extending in a transversal direction, the radiator 4 is disposed, with which the engine room 5 is divided into right and left spaces.

Of the divided spaces, one located on an air suction side of the radiator 4 (opposite side to a side on which the engine 3 is located) is taken as a radiator suction space S in which an oil cooler 41, a battery 42 and the like are disposed.

It should be noted that ambient air flows into the radiator suction space S through a mesh member 61 of a left side open-close cover 44L.

A front portion of the bonnet 6 is formed of a portion of the partition wall 8, which will be described later, and a rear portion of the bonnet 6 is provided with a rear open-close cover 43 which is openable and closable.

On lateral sides of the bonnet 6, there are provided the side open-close covers 44R, 44L which are openable and closable in a unified manner with the lateral protectors 35R, 35L, respectively.

As shown in FIG. 3, the partition wall 8 a part of which forms the front portion, of the bonnet 6 includes: the lower wall portion 45 described above; an upper inclined wall portion 46 extending rearward and upward from an upper end of the lower wall portion 45; and bulging parts 47R, 47L bulging frontward from right and left end portions of the upper inclined wall portion 46, respectively. The left bulging part 47L is provided with an ambient air inlet 11, which will be described later.

The upper inclined wall portion 46 and the bulging parts 47R, 47L are in hollow shape and have large wall thickness, and thus do not transmit heat of the engine room 5 to the cabin 7 (heat insulating effect).

The bonnet 6 includes: an upper fixing part 48 for covering a space between an upper end of the upper inclined wall portion 46 and a front end of the rear open-close cover 43; and right and left side fixing parts 49R, 49L each spanning from a front side to an upper side of the corresponding side open-close cover 44R or 44L.

The upper fixing part 48 is a top panel 48 of a support frame (not shown) for supporting the bonnet 6. The rear open-close cover 43 is axially supported on the top panel 48, and the right and left side open-close covers 44R, 44L are axially supported on the side fixing parts 49R, 49L, respectively.

It should be noted that, when the left side open-close cover 44L is opened, the oil cooler 41 and the battery 42 described above as well as a back side of the partition wall 8 (the left bulging part 47L) are exposed.

On the swivel deck 2, the cabin 7 is mounted through a mount device 15.

The mount device 15 includes: a pair of right and left vibration-proof rubbers (mount robbers) 50F in the front end portion of the swivel deck 2; and a pair of right and left vibration-proof rubbers 50R on the upper fixing part 48 of the bonnet 6. Intermediate portions in a longitudinal direction of the swivel deck 2 may also be provided with vibration-proof rubbers.

Each of the vibration-proof rubbers 50F, 50R is brought into contact with a corresponding corner of a bottom part of the cabin 7 to be mounted, and a load of the cabin 7 is supported by four or more points, to thereby absorb vibration of the engine 3, rocking during traveling or the like.

The cabin 7 is in a shape of a box with a lower end opened. The cabin 7 is mounted on a step 51 (serving as a bottom plate) in such a manner that this lower end opening is closed.

A front portion and an intermediate portion of the step 51 is supported by cylindrical step supporting members 53F standing on the swivel base 38, and a rear end portion of the step 51 is supported by a step mounting plate 53R projecting frontward from the upper end of the lower wall portion 45.

On the step 51, the air conditioner 20 is disposed together with the driver's seat 9, the operating lever and the like.

As shown in FIG. 1, the air conditioner 20 includes: an air conditioner main body 10 for sending warm air or cool air into the cabin 7; an interior air-ambient air switcher 54 for switching the air (interior air or ambient air) sent to the air conditioner main body 10; an introduction duct 16 for introducing ambient air through the interior air-ambient air switcher 54 to the air conditioner main body 10; an intake duct 13 in communication with the introduction duct 16; a filter 12 provided in the intake duct 13; and an ambient air intake planar member 14 for preventing the filter 12 from being detached.

Frontward of the air conditioner main body 10, the interior air-ambient air switcher 54 and the introduction duct 16, there is provided a removable front lid 55 which partitions an inside of the cabin 7 and a space for installing the air conditioner 20.

The air conditioner main body 10 has a heater function of generating warm air with using a heat medium heated by the engine 3, and a cooler function of generating cool air through heat absorption by an evaporator. The air conditioner main body 10 is disposed on a rear portion of the step 51 and rearward of the front lid 55 separating the air conditioning body 10 from the inside of the cabin 7.

It should be noted that the air conditioner main body 10 of the air conditioner 20 and the like are contained in a box 60 whose front side is closed with the front lid 55, and above the box 60, there are disposed the driver's seat 9 and operation instruments (i.e. the air conditioner main body 10 is disposed in a lower portion inside the cabin 7).

The interior air-ambient air switcher 54 is provided on one of lateral sides (left side in the drawing) of the air conditioner main body 10. With the use of a switching lever 56 swingably supported and projecting from the front lid 55 into the cabin 7, the interior air-ambient air switcher 54 is switchable between an ambient air introducing state G (solid lines and dotted lines in FIG. 1) in which air outside of the cabin 7 (ambient air) is introduced to the air conditioner main body 10 and an interior air introducing state N (two-dotted and dashed lines in FIG. 1) in which air inside the cabin 7 (interior air) is introduced to the air conditioner main body 10.

The introduction duct 16 for allowing ambient air to flow therein is a duct which extends approximately in the transversal direction and has an approximate rectangular cross section. One of right end portion and left end portion, or an intermediate portion in the transversal direction of the introduction duct 16 is attached and supported by a duct supporting member 52 on a cabin 7-side.

The duct supporting member 52 also serves as a partition plate for partitioning an interior of the box 60, which will be described later, and an exposed portion of the bottom part of the cabin 7. This enables the exposure of one of the right and left end portions (left end portion in the drawing) of the introduction duct 16, without allowing the interior air in the box 60 to leak out.

Therefore, when the interior air-ambient air switcher 54 is in the ambient air introducing state G, ambient air taken in from the ambient air inlet 11 is to be sent to the air conditioner main body 10. On the other hand, when in the interior air introducing state N, interior air of the box 60 and interior air of the cabin 7 is to be sent to the air conditioner main body 10.

At the left end portion of the introduction duct 16, an opening (communication opening) 16a in communication with a front end opening 13a of the intake duct 13 is provided.

The communication opening 16a is formed in a lower face of the left end portion, i.e. one of the end portions which is closer to a place where ambient air introduction is taken place, and a left rear portion of the step 51 is cut away so that the communication opening 16a is exposed to a bottom face side of the cabin 7, when the cabin 7 is removed from the swivel deck 2.

The intake duct 13 described above protrudes into the cabin 7-side through this cutout portion, when the cabin 7 is mounted on the swivel deck 2.

On a rim of the communication opening 16a, there is provided a projection 57 protruding downward into the front end opening 13a, which will be described later, of the intake duct 13.

It should be noted that the introduction duct 16 extends laterally outward from the interior air-ambient air switcher 54, is bent upward, and further extends laterally outward.

In other words, a level of the introduction duct 16 shifts upward from a level of the air conditioner main body 10 and the interior air-ambient air switcher 54 mounted on the step 51, with a step formed in the intermediate portion in the longitudinal direction, and thus a position of an outer end in the transversal direction of the communication opening 16a is higher than the level of the step 51.

The intake duct 13 is provided in the partition wall 8 (the left bulging part 47L) on the swivel deck 2 and fitted into a mounting hole 58 penetrating through the partition wall 8 (i.e. the intake duct 13 is supported on a swivel deck 2-side).

The mounting hole 58 has a certain length since the left bulging part 47L is formed to have a thickness to some extent, and thus the intake duct 13 can be supported by an inner periphery of the mounting hole 58. In addition, due to the thickness of the left bulging part 47L, a space for placing the filter 12, which will be described later, can be secured.

Since the mounting hole 58 is provided in a portion of the left bulging part 47L facing the radiator suction space S, the left bulging part 47L forming a front wall of the radiator suction space S is provided with both the ambient air inlet 11 and the ambient air intake planar member 14.

Most part of the intake duct 13 fitted into the mounting hole 58 protrudes frontward and upward from the left bulging part 47L. The intake duct 13 is cut obliquely relative to the longitudinal direction of the intake duct 13 to form the front end opening 13a which is set horizontal and opened upward. The front end opening 13a is exposed on an upper face of the swivel deck 2.

Therefore, when the cabin 7 is mounted on the swivel deck 2, the front end opening 13a faces the communication opening 16a of the introduction duct 16 exposed on the bottom face side of the cabin 7.

To put it another way, by providing the opening 16a of the introduction duct 16 and the opening 13a of the intake duct 13 in such a manner that they face each other, positioning of the openings 13a, 16a are determined, and thus by simply mounting the cabin 7 on the swivel deck 2 through the mount device 15 (the vibration-proof rubbers 50F, 50R), an ambient air introduction pathway can be formed up to the air conditioner main body 10, and thus assembly of the air conditioner (ambient air introduction mechanism) 20 can be facilitated.

The front end opening 13a of the intake duct 13 is made larger than the communication opening 16a of the introduction duct 16, and the projection 57 provided on the rim of the communication opening 16a protrudes into the front end opening 13a. With this configuration, by making the intake duct 13 in communication with the introduction duct 16, leaking of ambient air can be suppressed.

Moreover, since the projection 57 protrudes into the front end opening 13a, even when the cabin 7 mounted through the vibration-proof rubbers 50F, 50R rocks to some extent, a communication state between the introduction duct 16 and the intake duct 13 can be retained It should be noted that the front end opening 13a of the intake duct 13 has a flat face 59 formed along a rim, and the flat face 59 can be brought into contact with the rim of the communication opening 16a of the introduction duct 16. With this configuration, when the rim of the communication opening 16a is brought into contact with the flat face 59 of the intake duct 13, the intake duct 13 supports the left end portion of the introduction duct 16.

Further, when the filter 12 is fitted into the intake duct 13, which will be described later, the filter 12 is brought into contact with a rear end of the flat face 59, and thus positioning of the filter 12 in a direction of fitting can be determined.

A rear end of the intake duct 13 is exposed to the radiator suction space S, and an opening 11 on a rear end side of the intake duct 13 constitutes the ambient air inlet 11 for taking ambient air thereinto.

In other words, by providing the ambient air inlet 11 in the left bulging part 47L bulging frontward, the ambient air inlet 11 is positioned as close to the front as possible, to thereby shorten a distance from the ambient air inlet 11 to the air conditioner main body 10 and thus efficiently introduce ambient air in the radiator suction space S.

Figure 5:
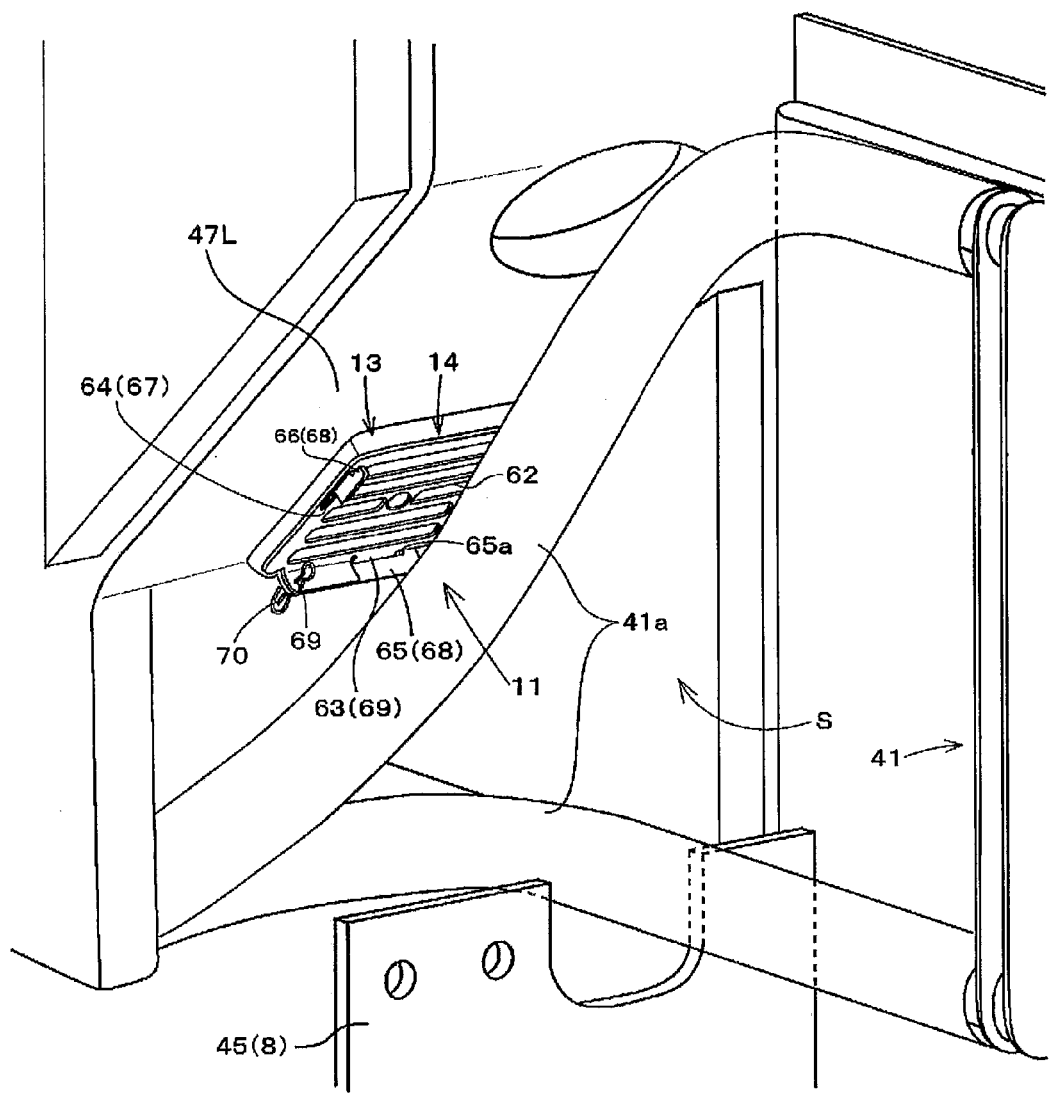
FIG. 5 is an enlarged perspective view of the ambient air inlet.

As shown in FIGS. 4-6, the ambient air inlet 11 is positioned frontward of the mesh member 61 of the left side open-close cover 44L and is oriented rearward. Therefore, it becomes possible to prevent water that has entered the radiator suction space S from the mesh member 61 in rainy weather, during car wash or the like to further enter the ambient air inlet 11 through the ambient air intake planar member 14

Into the intake duct 13, the filter 12 is placed (fitted), whose cross section is approximately rectangular and approximately similar to but slightly smaller than the opening of the ambient air inlet 11 (cross sectional shape of the intake duct 13).

The ambient air intake planar member 14 is an approximately rectangular plate which is removably attached to the rear end of the intake duct 13, provided with a plurality of slits 62, and approximately similar to but slightly larger than the opening of the ambient air inlet 11 (cross sectional shape of the intake duct 13).

As shown in FIG. 5, on one end side of the ambient air intake planar member 14, a projection 63 is formed which is configured to be fitted into a fitting hole 65*a* of a locking stopper 65 provided in a lower rim of the rear end of the intake duct 13, and on the other end side of the ambient air intake planar member 14, locking slits 64 are provided, with which respective locking hooks 66 provided in right and left rims of the rear end of the intake duct 13 are removably engageable.

Therefore, by fitting the projection 63 into the fitting hole 65*a*, hooking the locking slits 64 on the respective locking hooks 66, and then moving the ambient air intake planar member 14 along the back face of the left bulging part 47L with a predetermined distance, the ambient air intake planar member 14 can be locked with the rear end of the intake duct 13.

Accordingly, instruments such as an oil pipe 41*a* of the oil cooler 41 and the battery 42 can be positioned in a vicinity of the back face of the left bulging part 47L, to thereby improve space efficiency of the radiator suction space S.

It should be noted that the projection 63 and locking slit 64 of the ambient air intake planar member 14 are taken as a locking portion 67, and the locking stopper 65 and locking hook 66 of the intake duct 13 are taken as a locked portion 68.

A locking state between the locking portion 67 and the locked portion 68 is retained by a beta pin 70 inserted into communication holes 69 provided in the ambient air intake planar member 14 and the rear end of the intake duct 13.

Replacement of the filter 12 in the air conditioner 20 of the swiveling work machine 1 according to the present invention can be performed in the following manner.

As shown in FIG. 4, when the left side open-close cover 44L is opened, the ambient air intake planar member 14 for preventing the filter 12 from being detached is exposed.

Next, the beta pin 70 connecting the ambient air intake planar member 14 with the rear end of the intake duct 13 is removed, and the ambient air intake planar member 14 is shifted rearward and upward along the back face of the left bulging part 47L of the partition wall 8, to cancel the fitting state of the projection 63 into the fitting hole 65*a* and the locking state between the locking slit 64 and the locking hook 66. In this manner, the filter 12 can be removed together with the ambient air intake planar member 14.

Subsequently, the filter 12 on the ambient air intake planar member 14 is replaced with a fresh one, which is then placed in the intake duct 13 through the ambient air inlet 11.

Next, the ambient air intake planar member 14 is locked with the rear end of the intake duct 13, and the beta pin 70 is inserted so as to retain the locking state, to thereby complete the replacement of the filter 12, and then the left side open-close cover 44L is closed.

As described above, by providing the filter 12 in the ambient air inlet 11 of the air conditioner main body 10 formed in a portion of the partition wall 8 facing the radiator suction space S, the distance from the ambient air inlet 11 to the air conditioner main body 10 is made as short as possible, and thus ambient air on the suction side of the radiator 4 can be efficiently introduced to the air conditioner main body 10 through the filter 12.

In addition, by placing the filter 12 in the intake duct 13 protruding frontward from the partition wall 8, and removably attaching the ambient air intake planar member 14 to the rear end side of the intake duct 13 for the purpose of preventing the filter 12 from being detached, the intake duct 13 and the ambient air intake planar member 14 can be disposed in the radiator suction space S without protruding rearward, and thus the intake duct 13 does not hinder other instruments to be disposed in the radiator suction space S. As a result, use efficiency in the radiator suction space S is improved.

Moreover, by configuring the front end opening 13*a* of the intake duct 13 provided on the swivel deck 2-side and the opening 16*a* on an ambient air introduction side of the introduction duct 16 provided on the cabin 7-side in such a manner that they face each other, and thus by simply mounting the cabin 7 on the swivel deck 2, the ambient air introduction pathway can be formed up to the air conditioner main body 10, and thus assembly of the ambient air introduction mechanism can be facilitated.

It should be noted that the present invention is not limited to the above-described embodiment. Various properties of the swiveling work machine 1 or the like, such as configuration, entire structure, shape and size, can be appropriately altered or modified in accordance with the purport of the present invention.

The air conditioner main body 10 may have only one of the cooler function and the heater function.

The air conditioner main body 10 of the air conditioner 20 or the like may not be disposed inside the box 60 immediately under the driver's seat 9, as long as it is disposed in the lower portion inside the cabin 7. For example, it may be disposed in the vicinity of the driver's seat 9, including a position rearward of and under the driver's seat 9, and a position frontward of and under the driver's seat 9.

The cross section of each of the intake duct 13 and the filter 12 and the shape of the ambient air intake planar member 14 may not be approximately rectangular, as long as they are approximately similar to each other. For example, they may be in a shape of approximate circle or approximate ellipse.

An amount of ambient air introduced to the air conditioner main body 10 may be increased by making a cross sectional area of each of the ambient air inlet 11, the intake duct 13 and the introduction duct 16 as large as possible, in accordance with the space frontward of the left bulging part 47L and an empty space in the box 60.

The locking portion 67 and the locked portion 68 are not limited to the projection 63 with the locking slit 64 and the locking stopper 65 with the locking hook 66, respectively. Alternatively, they may be locked through screws or fittings, as long as the ambient air intake planar member 14 is removably engageable with the rear end of the intake duct 13.

What is claimed is:

1. A swiveling work machine comprising:
    a swivel deck;
    an engine disposed rearward of the swivel deck;
    a suction type radiator disposed rearward of the swivel deck;
    a bonnet covering the engine and the radiator and forming an engine room;
    a cabin disposed frontward of the engine room;
    a hollow partition wall standing on the swivel deck between the cabin and the engine room and forming a front portion of the bonnet;

an air conditioner main body disposed frontward of the partition wall and in a lower portion of the cabin;

an ambient air inlet for supplying ambient air to the air conditioner main body, the ambient air inlet being formed in a portion of the partition wall facing a radiator suction space; and a filter provided in the ambient air inlet;

wherein the hollow partition wall has a space defined therein that receives the filter.

2. The swiveling work machine according to claim 1, wherein the ambient air inlet is formed in an intake duct protruding frontward from the partition wall, the inlet duct provided in the space defined by the hollow partition wall, the filter being placed in the intake duct, and an ambient air intake planar member for preventing the filter from being detached is removably attached to a rear end side of the intake duct.

3. The swiveling work machine according to claim 2, wherein the cabin is provided on the swivel deck through a mount device, an introduction duct for leading ambient air to the air conditioner main body is supported on a cabin side, and a front end opening of the intake duct supported on a swivel deck-side faces an opening of the introduction duct on an ambient air introduction side.

* * * * *